UNITED STATES PATENT OFFICE.

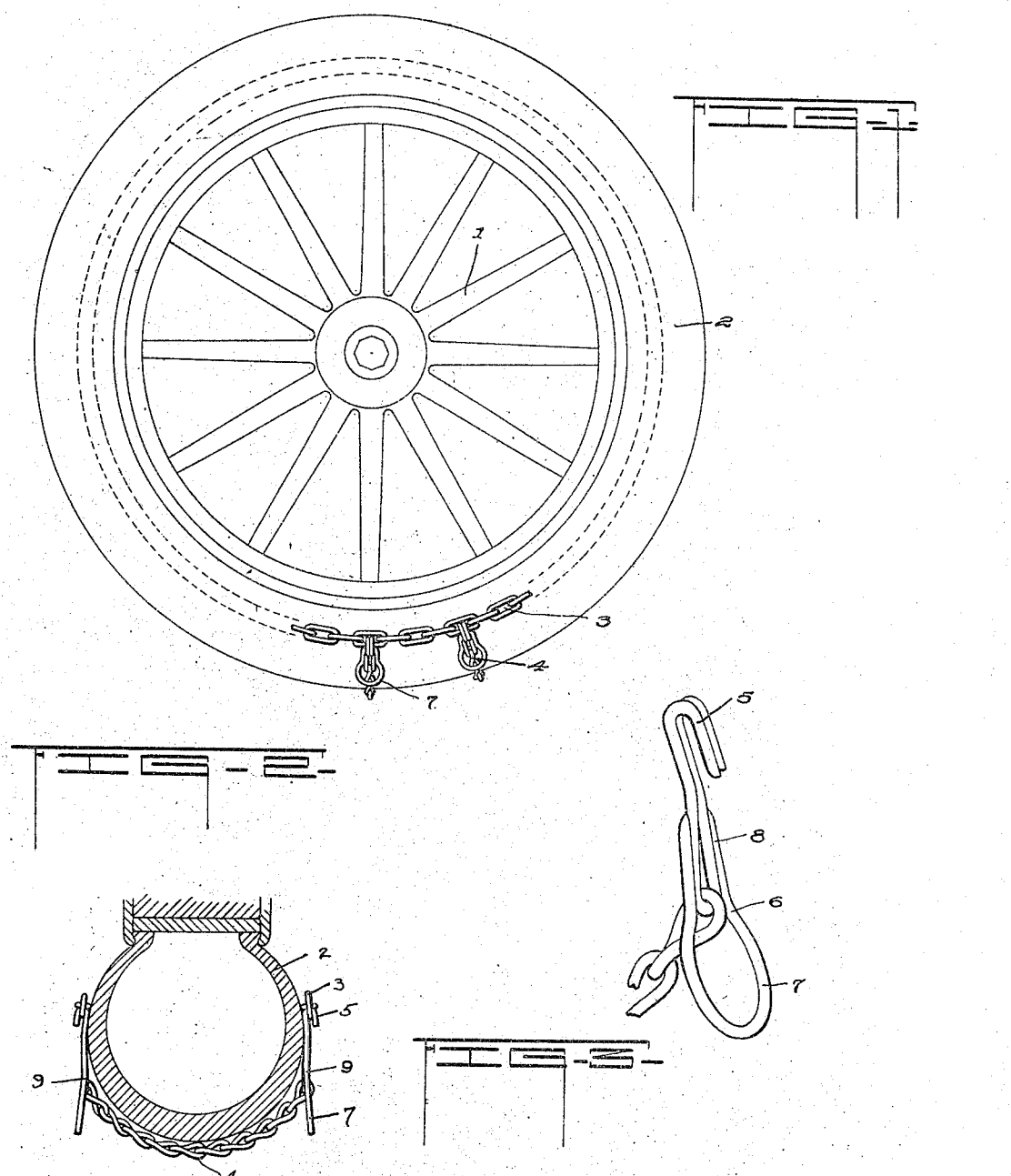

FRED E. MESSLER, OF CANTON, ILLINOIS.

NON-SKID CHAIN.

1,239,711.  Specification of Letters Patent.  Patented Sept. 11, 1917.

Application filed November 18, 1916. Serial No. 131,983.

*To all whom it may concern:*

Be it known that I, FRED E. MESSLER, a citizen of the United States, a resident of Canton, in the county of Fulton and State of Illinois, have invented new and useful Improvements in Non-Skid Chains, of which the following is a specification.

My invention relates to improvements in non-skid chains, particularly designed for use on tires of vehicles and the like, and the principal object is the provision of such a device which will eliminate the objectionable side skid.

A further object of this invention is the provision in connection with the annular side chain of a plurality of cross or transverse chains secured thereto, and adapted to extend over the outside of the wheel or tire, these cross or transverse chains being provided with the elongated members which extend substantially at a tangent to the sides of the tire, and provide extended portions to engage the material of the road on which the vehicle is run to prevent side skidding.

A further object of this invention is the provision of an article of manufacture including a section of chain having an attaching means at each end for attachment to the side chains of a non-skid device, and provided with means for preventing lateral or side skidding.

To the accomplishment of the foregoing and such other objects as may hereinafter appear, my invention consists in the combination, construction and arrangement of parts hereinafter described and then sought to be defined in the appended claims, reference being had to the accompanying drawings forming a part hereof, and which shows merely for the purpose of illustrative disclosure, a preferred embodiment of my invention, it being understood that various changes may be made in practice within the scope of the claims without digressing from my inventive idea.

In the drawings,

Figure 1 indicates a wheel and tire provided with the non-skidding chain constructed so as to embody my invention;

Fig. 2 is a vertical cross-section through the same, showing one of the cross or transverse chains in elevation;

Fig. 3 is a detailed perspective view of the end portion of one of the cross or transverse chains, showing the extended member for preventing the side skid.

In the majority of non-skid chains or other devices at present in use, no provision is made for the prevention of side skid, particularly in soft or muddy roads or streets. In practical experience, this form of skidding is exceedingly dangerous, resulting in ditching the vehicle and other numerous forms of accidents. It is, therefore, my purpose to provide a non-skid device which will afford traction in soft or muddy streets or roads and which is also provided with means for preventing the side skid.

Referring now to the drawing, the numeral 1 designates the wheel having the tire 2 thereon. The non-skid device includes the usual pair of spaced chain members 3 which are adapted to be positioned around the sides of the tire and which are connected across the tread of the tire by means of the transverse or cross chains 4. These transverse or cross chains 4 have the usual hook 5 for engaging in the links of the side chains 3 for attachment thereto.

Secured to the hook member 5 of each side of each cross or transverse chain, is the extended member 6 which is shown as being provided with the loop portion 7 which extends at a slight angle to the upper securing portion 8 thereof, the bend or angle being indicated at 9, the purpose of which will be described later.

These side skid preventing members are so arranged that when the chains are applied to the tire or wheel and the vehicle is running over hard roads or streets, that they will just engage the surface thereof, and if the tire is deflated too much, they will then bend outwardly away from the tire, due to the slightly flared position thereof on account of the bend 9. The engaging portions of these side skid driven members extend away from the tire and chain so that when traveling in soft or muddy streets or roads, they will form a shoulder or abutment preventing the sidewise or lateral movement of the wheel. This is a very important feature of this device and has proved very effective in practice.

What I claim is:—

1. A device of the character described, including in combination, side chains, a plurality of cross or transverse chains connected thereto and adapted to extend entirely across the tire and each of said cross or transverse chains having a depending member on each side connected to only one of its links to prevent side skidding.

2. A device of the character described, including in combination, side chains, a plurality of cross or transverse chains connected thereto, and each of said cross or transverse chains having a member depending on each side from a point adjacent the point of attachment to said side chains, the engaging portion of said member being spaced from its cross or transverse chain to prevent side skidding.

3. A device of the character described, including in combination, a pair of flexible members arranged in spaced relation and adapted to extend around the sides of a wheel or tire, and a plurality of cross or transverse flexible members secured to and connecting said spaced flexible members and adapted to extend entirely across the tire and each having additional elements secured thereto and projecting at an angle therefrom so as to assume a tangential relation with respect to the sides of the wheel or tire to prevent side skidding.

4. A device of the character described including in combination, side chains, a plurality of cross or transverse chains having a hooked connection with said side chains, and a side skid preventing member secured to each hook and depending therefrom so as to be positioned at an angle to said cross or transverse chains and tangential to the sides of the wheel when applied thereto.

5. As an article of manufacture, a section of chain having a hook at each end and an extension member secured to each hook and adapted to project at an angle to said chain and substantially tangential to the sides of the wheel or tire when applied thereto.

6. As an article of manufacture, a section of chain having a hook at each end and a loop member secured to each hook and adapted to project at an angle to said chain and substantially tangential to the sides of the wheel or tire when applied thereto.

7. As an article of manufacture, a section of chain having a hook at each end and an extension member secured to each hook and bent at a slight angle therefrom, so as to project it at an angle to said chain and substantially tangential to the sides of the wheel or tire when applied thereto.

8. As an article of manufacture a flexible member having attaching means at each end adapted for attachment to the annularly arranged side members of a non-skid device, and having separate extension members one connected to each side and adapted to project at an angle to said flexible member and substantially tangential to the sides of the wheel or tire when applied thereto.

FRED E. MESSLER.